(12) United States Patent
Holland et al.

(10) Patent No.: US 9,558,536 B2
(45) Date of Patent: Jan. 31, 2017

(54) BLUR DOWNSCALE

(71) Applicant: Apple Inc., Cupertino, CA (US)

(72) Inventors: Peter F. Holland, Los Gatos, CA (US); Eric Young, Sunnyvale, CA (US); Guy Cote, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/676,615

(22) Filed: Apr. 1, 2015

(65) Prior Publication Data
US 2016/0292827 A1    Oct. 6, 2016

(51) Int. Cl.
G06K 9/40    (2006.01)
G06T 5/00    (2006.01)
G06T 3/40    (2006.01)

(52) U.S. Cl.
CPC ............ G06T 5/002 (2013.01); G06T 3/4023 (2013.01)

(58) Field of Classification Search
CPC .................................. G06T 5/002; G06T 3/40
USPC ........................................................ 382/254
See application file for complete search history.

(56) References Cited

U.S. PATENT DOCUMENTS

| | | | |
|---|---|---|---|
| 5,001,768 A * | 3/1991 | Mita | H04N 1/401 348/251 |
| 5,365,277 A * | 11/1994 | Greggain | H04N 5/14 348/571 |
| 5,602,599 A * | 2/1997 | Greggain | G06T 3/4084 348/571 |
| 6,717,586 B2 | 4/2004 | Fujiki | |
| 6,925,210 B2 | 8/2005 | Herf | |
| 7,257,271 B2 * | 8/2007 | Adams, Jr. | G06T 5/002 382/167 |
| 8,761,507 B1 | 6/2014 | Steger | |
| 8,872,856 B1 * | 10/2014 | Masterson | G09G 5/393 345/660 |
| 9,165,302 B2 * | 10/2015 | Baxley | G06Q 30/02 |
| 2005/0134734 A1 * | 6/2005 | Adams, Jr. | G06T 5/002 348/518 |
| 2010/0083144 A1 * | 4/2010 | Baxley | G06Q 30/02 715/760 |
| 2013/0208093 A1 | 8/2013 | Sun et al. | |
| 2013/0216128 A1 * | 8/2013 | Zomet | G06T 11/60 382/162 |
| 2013/0222413 A1 * | 8/2013 | Tripathi | G09G 5/02 345/600 |
| 2015/0170330 A1 * | 6/2015 | Yoon | G06T 1/20 345/648 |
| 2015/0229882 A1 * | 8/2015 | Liu | H04N 7/15 348/14.08 |

* cited by examiner

Primary Examiner — Feng Niu
(74) Attorney, Agent, or Firm — Rory D. Rankin; Meyertons, Hood, Kivlin, Kowert & Goetzel, P.C.

(57) ABSTRACT

Systems, apparatuses, and methods for generating a blur effect on a source image in a power-efficient manner. Pixels of the source image are averaged as they are read into pixel buffers, and then the source image is further downscaled by a first factor. Then, the downscaled source image is upscaled back to the original size, and then this processed image is composited with a semi-transparent image to create a blurred effect of the source image.

20 Claims, 11 Drawing Sheets

BLUR DOWNSCALE

BACKGROUND

Technical Field

Embodiments described herein relate to the field of graphical information processing and more particularly, to efficiently generating blurred effects on a display.

Description of the Related Art

Part of the operation of many computer systems, including portable digital devices such as mobile phones, notebook computers, and the like, is to display images on a display device. Accordingly, these systems typically incorporate functionality for generating images and data, including video information, which are subsequently output to the display device. Such devices typically include a graphics processing unit (GPU), video graphics circuitry (i.e., a display pipeline), and/or other logic to process images and video information for subsequent display.

Typically, the smallest item of image information in digital imaging is called a "picture element"—more generally referred to as a "pixel." For convenience, pixels are generally arranged in a regular two-dimensional grid. By using such an arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have multiple values corresponding to each of the colors red, green, and blue. By combining these colors in various ways, a wide variety of colors in the visible spectrum (that portion of the electromagnetic spectrum visible to the human eye) may be generated. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Frequently, image and video information displayed on display devices such as liquid crystal display (LCD) and light emitting diode (LED) displays is interpreted as a succession of ordered image frames, or "frames" for short. While generally a frame is one of the many still images that make up a complete moving picture or video stream, a frame can also be interpreted more broadly as simply a still image displayed on a digital (discrete or progressive scan) display. A frame typically consists of a specified number of pixels according to the resolution of the image/video frame. Most graphics systems use memories (commonly referred to as "frame buffers") to store pixels for image and video frame information. The information in a frame buffer typically includes color values for every pixel to be displayed on the screen.

Processing the source image data in the source frames can consume large amounts of power when generating various special effects desired in many videos, games, and images being displayed on modern computing systems. For portable digital devices employing a display device, it is challenging to generate these special effects on the display device while at the same time minimizing power consumption so as to maximize the battery life of the portable device.

SUMMARY

Systems, apparatuses, and methods for generating blur for at least a portion of an output frame are contemplated.

In one embodiment, an apparatus may include a display pipeline, GPU, and scaler rotator unit. The apparatus may also include or be connected to a display. In one embodiment, expensive image/video processing operations from a power perspective may be offloaded from the GPU to the scaler rotator unit. In some embodiments, the display pipeline may be configured to perform a final pass of processing on the image(s) before driving the processed images to the display.

In various embodiments, the apparatus may be configured to perform a blur operation on at least a portion of a source image in a power-efficient manner. In one embodiment, the apparatus may be configured to perform the blur operation by downscaling a given source image portion by a first factor, upscaling the downscaled given source image portion back to its original size, and then compositing this modified portion with a semi-transparent layer. The resultant image portion has a blurred appearance, with the advantage that the image portion was generated using less power than typically required to generate a blur effect.

In one embodiment, the scaler rotator unit may be configured to downscale the source image to create a downscaled image. The scaler rotator unit may include pixel buffers for storing received source image pixels, and the scaler rotator unit may also include a scaling circuit which is capable of downscaling a source image by a factor of 'N', wherein 'N' is an integer greater than one. The scaler rotator unit may be capable of downscaling the source image by a factor of M*N in a single pass through the scaling circuit, wherein 'M' is a multiple of two. The scaler rotator unit may average a group of 'M' pixels as the 'M' pixels are received, and then the scaler rotator unit may write the averaged pixel value into a corresponding pixel buffer. In one embodiment, the averaged pixels may be written into the pixel buffers so as to perform a 90 degree rotation of the averaged pixels. Then, horizontal and vertical scaling may be performed on the averaged pixels on a first pass through the scaling circuit of the scaler rotator unit. If more downscaling is required, additional passes may be made through the scaler rotator unit. Otherwise, the downscaled pixels may be sent back to the GPU to be upscaled and combined with a semi-transparent image to create the blurred effect.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a first functional unit . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
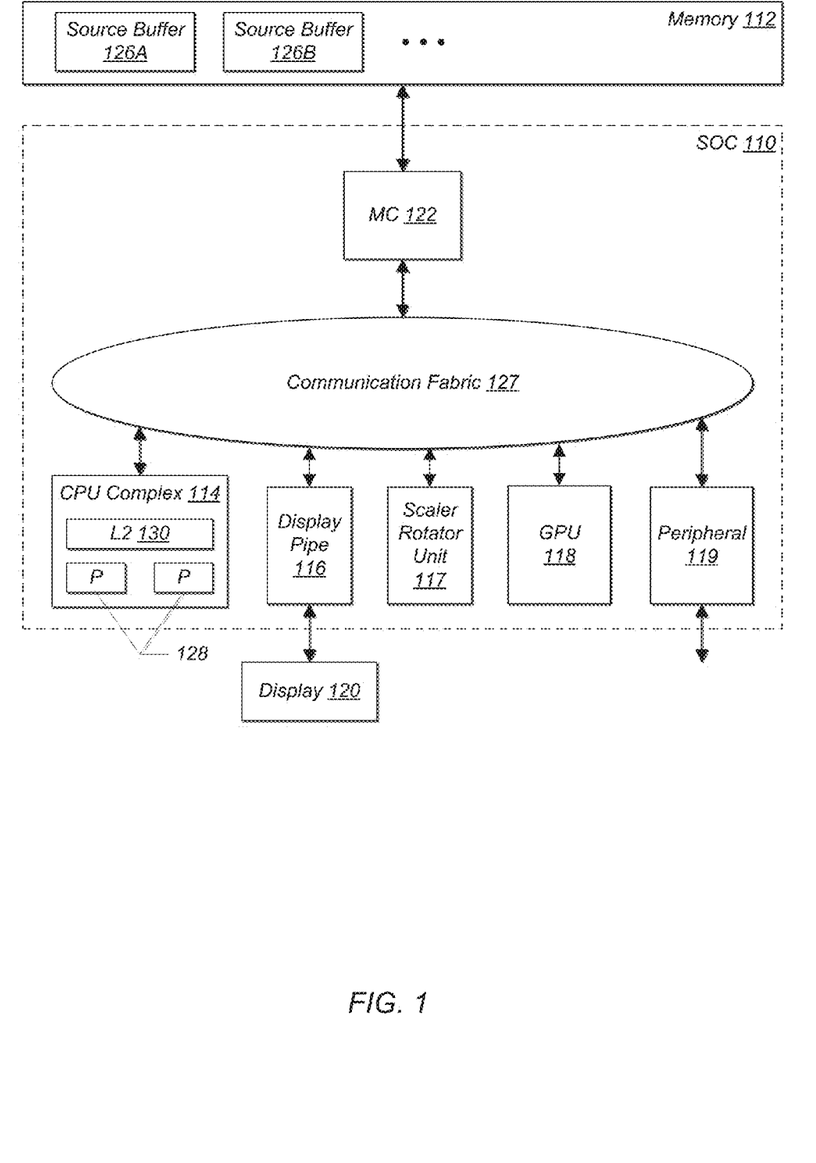
FIG. 1 is a block diagram illustrating one embodiment of a system on chip (SOC) coupled to a memory and one or more display devices.

Referring now to FIG. 1, a block diagram of one embodiment of a system on chip (SOC) 110 is shown coupled to a memory 112 and display device 120. A display device may be more briefly referred to herein as a display. As implied by the name, the components of the SOC 110 may be integrated onto a single semiconductor substrate as an integrated circuit "chip." In some embodiments, the components may be implemented on two or more discrete chips in a system. However, the SOC 110 will be used as an example herein. In the illustrated embodiment, the components of the SOC 110 include a central processing unit (CPU) complex 114, display pipe 116, scaler rotator unit 117, graphics processing unit (GPU) 118, peripheral component 119 (more briefly, "peripheral"), a memory controller (MC) 122, and a communication fabric 127. The components 114, 116, 117, 118, 119, and 122 may all be coupled to the communication fabric 127. The memory controller 122 may be coupled to the memory 112 during use. Similarly, the display pipe 116 may be coupled to the display 120 during use. In the illustrated embodiment, the CPU complex 114 includes one or more processors 128 and a level two (L2) cache 130.

The display pipe 116 may include hardware to process one or more still images and/or one or more video sequences for display on the display 120. Generally, for each source still image or video sequence, the display pipe 116 may be configured to generate read memory operations to read the data representing respective portions of the frame/video sequence from the memory 112 through the memory controller 122.

The display pipe 116 may be configured to perform any type of processing on the image data (still images, video sequences, etc.). In one embodiment, the display pipe 116 may be configured to scale still images and to dither, scale, and/or perform color space conversion on their respective portions of frames of a video sequence. The display pipe 116 may be configured to combine the still image frames and the video sequence frames to produce output frames for display. More particularly, display pipe 116 may be configured to retrieve respective portions of source frames from one or more source buffers 126A-126B stored in the memory 112, composite frames from the source buffers, and display the resulting frames on display 120. Source buffers 126A and 126B are representative of any number of source frame buffers which may be stored in memory 112. Accordingly, display pipe 116 may be configured to read the multiple source buffers 126A-126B and composite the image data to generate the output frame.

In one embodiment, GPU 118 may be configured to generate a blur effect on at least a portion of a source frame, wherein the source frame is used to generate an output frame driven to display 120. GPU 118 may be configured to convey the pixels of a source image (or portion thereof) which is to be blurred to scaler rotator unit 117. Scaler rotator unit 117 may be configured to downscale the source image by a requested amount. In one embodiment, the required amount of downscaling may be specified by GPU 118. Then, after performing the downscaling of the source image, scaler rotator unit 117 may convey the downscaled source image to GPU 118. GPU 118 may upscale the downscaled source image back to its original size, and then combine this processed image with a semi-transparent image to create the blurred effect of the source image. Alternatively, in another embodiment, scaler rotator unit 117 may also perform the upscaling of the downscaled source image rather than conveying the downscaled source image to GPU 118 to be upscaled by GPU 118.

The display 120 may be any sort of visual display device. The display 120 may be a liquid crystal display (LCD), light emitting diode (LED), plasma, cathode ray tube (CRT), etc. The display 120 may be integrated into a computing system including the SOC 110 (e.g. a smart phone or tablet) and/or may be a separately housed device such as a computer monitor, television, or other device.

In some embodiments, the display 120 may be directly connected to the SOC 110 and may be controlled by the display pipe 116. That is, the display pipe 116 may include hardware (a "backend") that may provide various control/data signals to the display, including timing signals such as one or more clocks and/or the vertical blanking period and horizontal blanking interval controls. The clocks may include the pixel clock indicating that a pixel is being transmitted. The data signals may include color signals such as red, green, and blue, for example. The display pipe 116 may control the display 120 in real-time or near real-time, providing the data indicating the pixels to be displayed as the display is displaying the image indicated by the frame. The interface to such display 120 may be, for example, VGA, HDMI, digital video interface (DVI), a liquid crystal display (LCD) interface, a plasma interface, a cathode ray tube (CRT) interface, any proprietary display interface, etc.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or an interface to the other components of the system (e.g., an interface to the communication fabric 127).

Peripheral 119 is representative of any number of peripherals, wherein each peripheral may be any set of additional hardware functionality included in the SOC 110. For example, the peripheral(s) 119 may include video peripherals such as video encoder/decoders, image signal processors for image sensor data such as camera, scalers, rotators, blenders, graphics processing units, etc. The peripheral(s) 119 may include audio peripherals such as microphones, speakers, interfaces to microphones and speakers, audio processors, digital signal processors, mixers, etc. The peripheral(s) 119 may include interface controllers for various interfaces external to the SOC 110 including interfaces such as Universal Serial Bus (USB), peripheral component interconnect (PCI) including PCI Express (PCIe), serial and parallel ports, etc. The peripheral(s) 119 may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components and subcomponents of the SOC 110 may vary from embodiment to embodiment. There may be more or fewer of each component/subcomponent than the number shown in FIG. 1. It is also noted that SOC 110 may include many other components not shown in FIG. 1. In various embodiments, SOC 110 may also be referred to as an integrated circuit (IC), an application specific integrated circuit (ASIC), or an apparatus.

Figure 2:
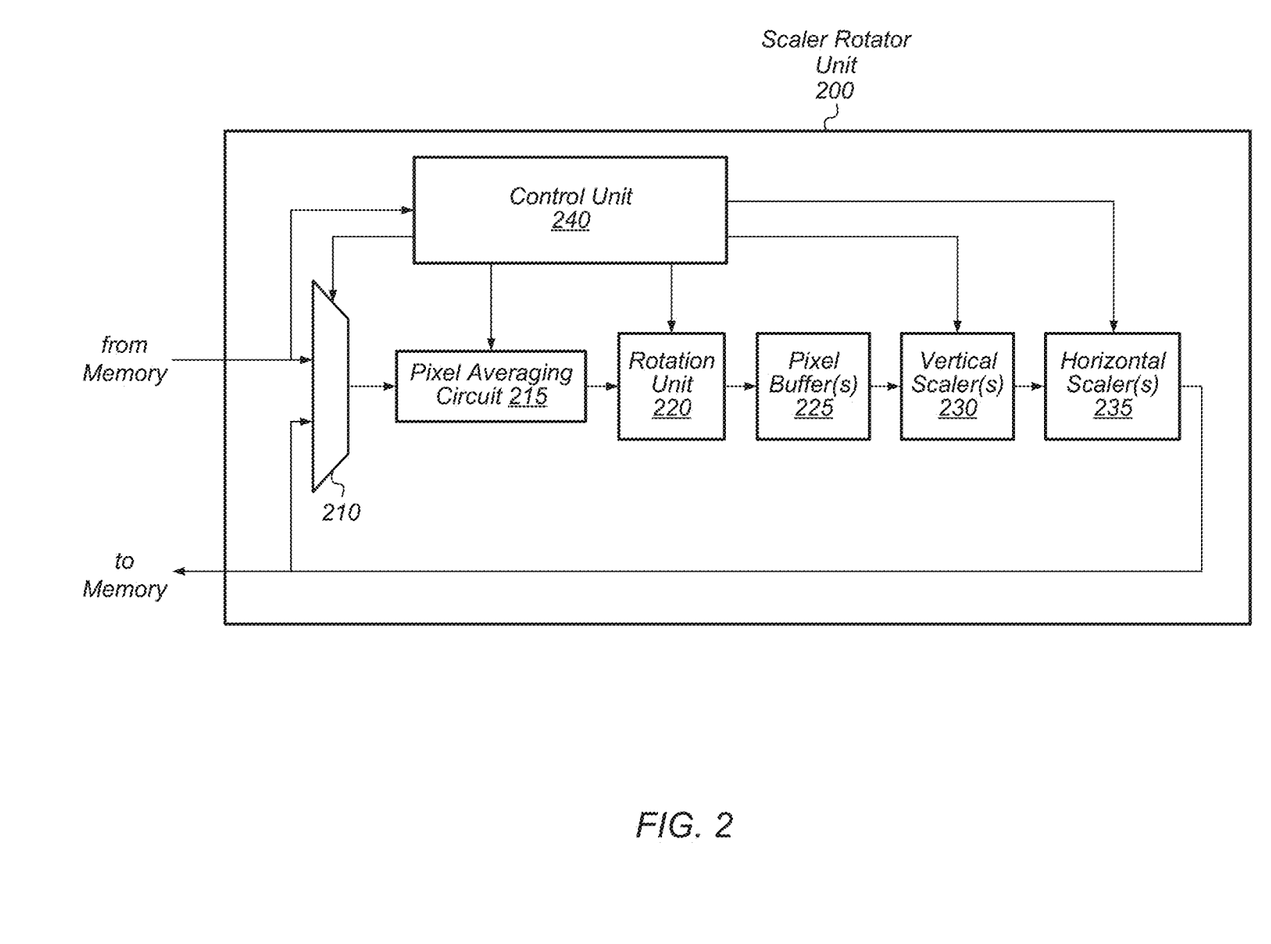
FIG. 2 is a block diagram of one embodiment of a scaler rotator unit.

Turning now to FIG. 2, a generalized block diagram of one embodiment of a scaler rotator unit 200 is shown. Scaler rotator unit 200 may represent scaler rotator unit 117 included in SoC 110 of FIG. 1. Scaler rotator unit 200 may be configured to scale and/or rotate source image data received from a memory, GPU, and/or other functional units of a SoC. The source image data may be coupled to mux 210, which also receives the output of scaler rotator unit 200 coupled back to the input for cases when multiple passes through scaler rotator unit 200 are utilized. For example, if the desired downscale factor for the source image data is 32λ, and if the scaler rotator unit 200 is able to downscale by a maximum factor of 16× (in one embodiment), then two passes through scaler rotator unit 200 would be utilized in this scenario. Other scenarios may utilize different scaling factors and/or other numbers of passes through scaler rotator unit 200.

Figure 3:
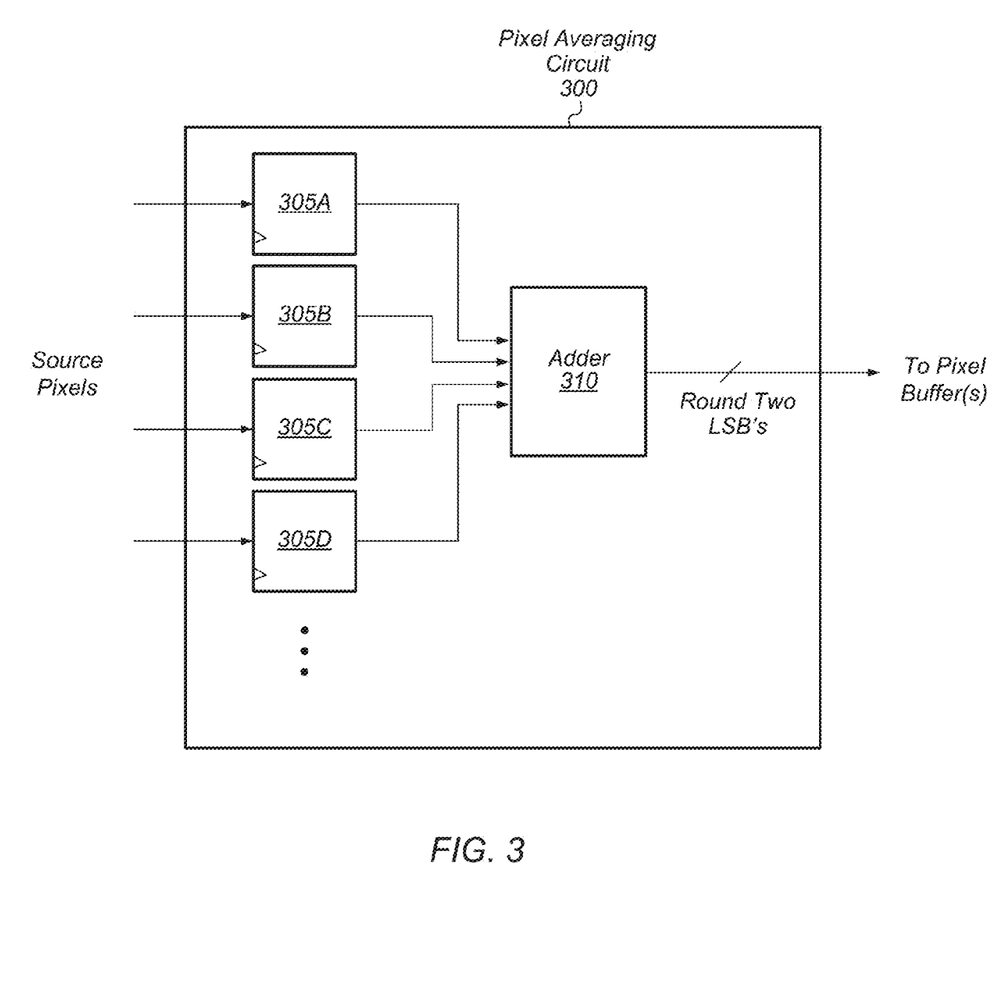
FIG. 3 is a block diagram illustrating one embodiment of a pixel averaging circuit.

The output of mux 210 may be coupled to pixel averaging circuit 215 where groups of pixels may be averaged to perform a low-power downscaling of the received pixels. In one embodiment, the groups of pixels may be even numbered groups of pixels. In embodiments where rotation is desired, the averaged pixels may be written into pixel buffers(s) 225 in such a way that a rotation is performed. This rotation is represented by rotation unit 220 at the output of pixel averaging circuit 215. Pixels may be conveyed from pixel buffer(s) 225 to vertical scaler(s) 230 where vertical scaling may be performed. After vertical scaling is performed, horizontal scaler(s) 235 may perform horizontal scaling on the vertically scaled pixels. It is noted that although vertical scaling is performed prior to horizontal scaling as shown in FIG. 3, in other embodiments, horizontal scaling may be performed prior to vertical scaling.

Control unit 240 may select which input is coupled to the output of mux 210. Control unit 240 may receive the desired scaling and rotation values from the GPU, and then control unit 240 may configure the pixel averaging circuit 215, rotation unit 220, vertical scaler(s) 230, and horizontal scaler(s) 235 to perform the corresponding operations based on the specified scaling and rotation values.

Vertical scaler(s) 230 and horizontal scaler(s) 235 may be configured to downscale by a maximum amount in the vertical and horizontal directions, respectively. For example, in one embodiment, vertical scaler(s) 230 and horizontal scaler(s) 235 may be able to downscale by a factor of 8λ. However, a single pass may be able to scale by more than a factor of 8× in one direction by using the pixel averaging circuit to average the pixels as they are read in and written to pixel buffer(s) 225. For example, in one embodiment, pixel averaging circuit 215 may be configured to average each group of four pixels, resulting in a 4X horizontal downscaling. When the maximum of 8× horizontal downscaling is performed by horizontal scaler(s) 235, then a total of 32× horizontal downscaling is possible in a single pass through scaler rotator unit 200.

Depending on the embodiment, the pixel data may or may not be rotated by rotation unit 220. In embodiments when rotation is not implemented, rotation unit 220 may be a passthrough unit or may be omitted. Also, in some embodiments, rotation unit 220 may not be an actual functional unit, but rotation unit 220 may represent that pixel data may be written into pixel buffer(s) 225 in such a way as to perform a rotation of the pixel data.

Referring now to FIG. 3, a block diagram of one embodiment of a pixel averaging circuit 300 is shown. Pixel averaging circuit 300 may represent pixel averaging circuit 215 included in scaler rotator unit 200 of FIG. 2. As shown, pixel averaging circuit 300 is configured to average groups of four pixels from the same row. By generating an average of each group of four pixels, pixel averaging circuit 300 is effectively performing horizontal downscaling of the pixels by a factor of four. It should be understood that the pixel averaging circuit 300 shown in FIG. 3 is merely one example of a pixel averaging circuit that may be utilized in one embodiment. In other embodiments, other pixel averaging circuits may be utilized that average other numbers of even-numbered pixels. Additionally, other arrangements of circuit elements may be utilized within pixel averaging circuits in other embodiments.

Source pixels from the same row may be received by pixel averaging circuit 300 and coupled to registers 305A-D. Although not shown, pixel averaging circuit 300 may also include other sets of registers for simultaneously computing averages of multiple groups of pixels in a single clock cycle. The outputs of registers 305A-D may be coupled to adder 310 which may be configured to add the four inputs together to generate a sum. This sum may be divided by four by rounding and eliminating the two least significant bits (LSBs) to generate an average of the four source pixels, and then this averaged pixel value may be coupled to the pixel buffer(s) (not shown). In one embodiment, the averaged pixel values may be written into the pixel buffer(s) in such a way that a rotation is performed on the averaged pixel values. In another embodiment, the averaged pixel values may be written into the pixel buffer(s) without performing a rotation.

Figure 4:
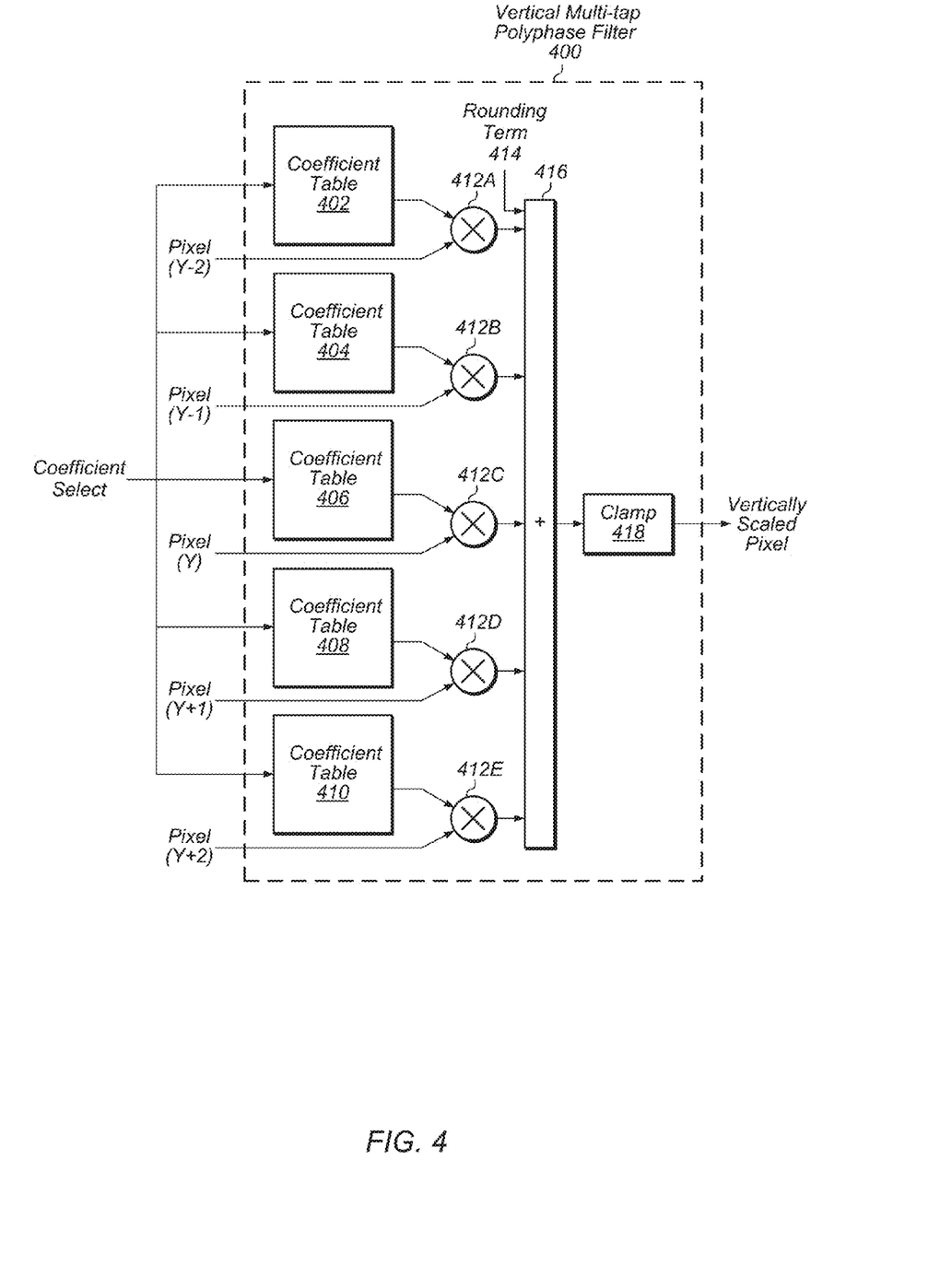
FIG. 4 is a block diagram illustrating one embodiment of a vertical multi-tap polyphase filter.

Turning now to FIG. 4, a block diagram of one embodiment of a vertical multi-tap polyphase filter 400 is shown.

Each vertical scaler of vertical scaler(s) 230 (of FIG. 2) may include a vertical multi-tap polyphase filter 400. In one embodiment, multi-tap polyphase filter 400 may be a five-tap vertical scaler, and each of the five taps may include a coefficient table. In other embodiments, multi-tap polyphase filter 400 may include other numbers of taps.

Each coefficient table 402, 404, 406, 408, and 410 may include any number of entries, depending on the embodiment. The pixel values may be centered on pixel variable Y, and the pixel values that are input to filter 400 may include Y−2, Y−1, Y, Y+1, and Y+2. Each pixel may be multiplied by a coefficient from the corresponding coefficient table of tables 402-410. Then the outputs from the five multipliers 412A-E and a rounding term 414 may be added together by adder 416, and then the result may be clamped by clamp unit 418. The output from clamp unit 418 may be a vertically scaled pixel, and this value may be conveyed to the input of a corresponding horizontal scaler. In one embodiment, pipelined logic may be utilized for implementing multipliers 412A-E and adder 416.

Figure 5:
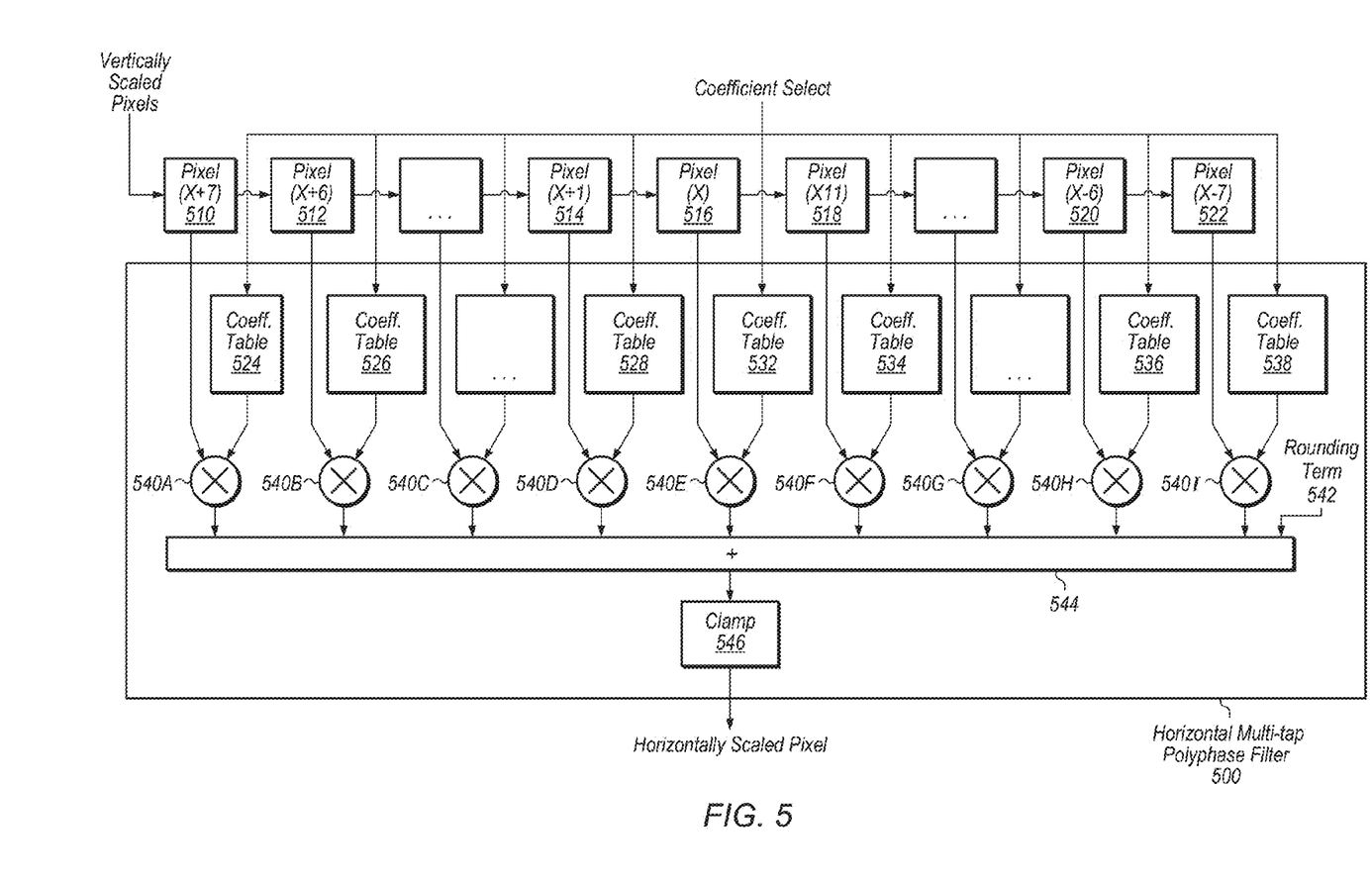
FIG. 5 is a block diagram illustrating one embodiment of a horizontal multi-tap polyphase filter.

Referring now to FIG. 5, a block diagram of one embodiment of a horizontal multi-tap polyphase filter 500 is shown. Each horizontal scaler of horizontal scaler(s) 235 (of FIG. 2) may include a multi-tap polyphase filter 500. In one embodiment, filter 500 may be a 15-tap polyphase filter. In other embodiments, filter 500 may include other numbers of taps. Each tap may include a corresponding coefficient table 524-538. Each coefficient table may include any number of coefficient entries, depending on the embodiment.

As illustrated in FIG. 5, the pixel values may be centered around variable X, and the pixel values may include X+7, . . . , X+1, X, X−1, . . . , X−7. Each pixel in the chain of shift registers 510-522 may be multiplied by a coefficient from the corresponding coefficient table 524-538. The coefficients may be stored in programmable registers within coefficient tables 524-538. The outputs from the multipliers 540A-I and a rounding term 542 may be summed together in adder 544, and then the result from adder 544 may be clamped in clamp unit 546. The output from clamp unit 546 may be a horizontally scaled pixel, and this value may be conveyed back to the input of the scaler rotator unit, to the GPU, to memory, or to another location. In one embodiment, the horizontal scaler may utilize pipelined logic for implementing the multipliers 540A-I and adder 544.

In one embodiment, there may be four horizontal scalers in horizontal scalers 235, one for each ARGB pixel component. In other embodiments, other numbers of horizontal scalers may be utilized. The four horizontal scalers may all be working on the same horizontal digital differential analyzer (DDA) value but on different vertical pixels. As a vertical scaler processes pixels and conveys the pixels to a horizontal scaler, pixels are shifted through the taps, increasing the pointer of the center tap. The horizontal scaler may compare the center tap to the pixel required by the current DDA value, and once the values match, then the horizontal scaler may start generating output pixels. On any given clock when the horizontal scaler is producing a scaled output pixel, if the next DDA value also matches the current center tap value, then the horizontal scaler may not shift in a new pixel and may stall the corresponding vertical scaler from pushing in a new pixel.

Figure 6:
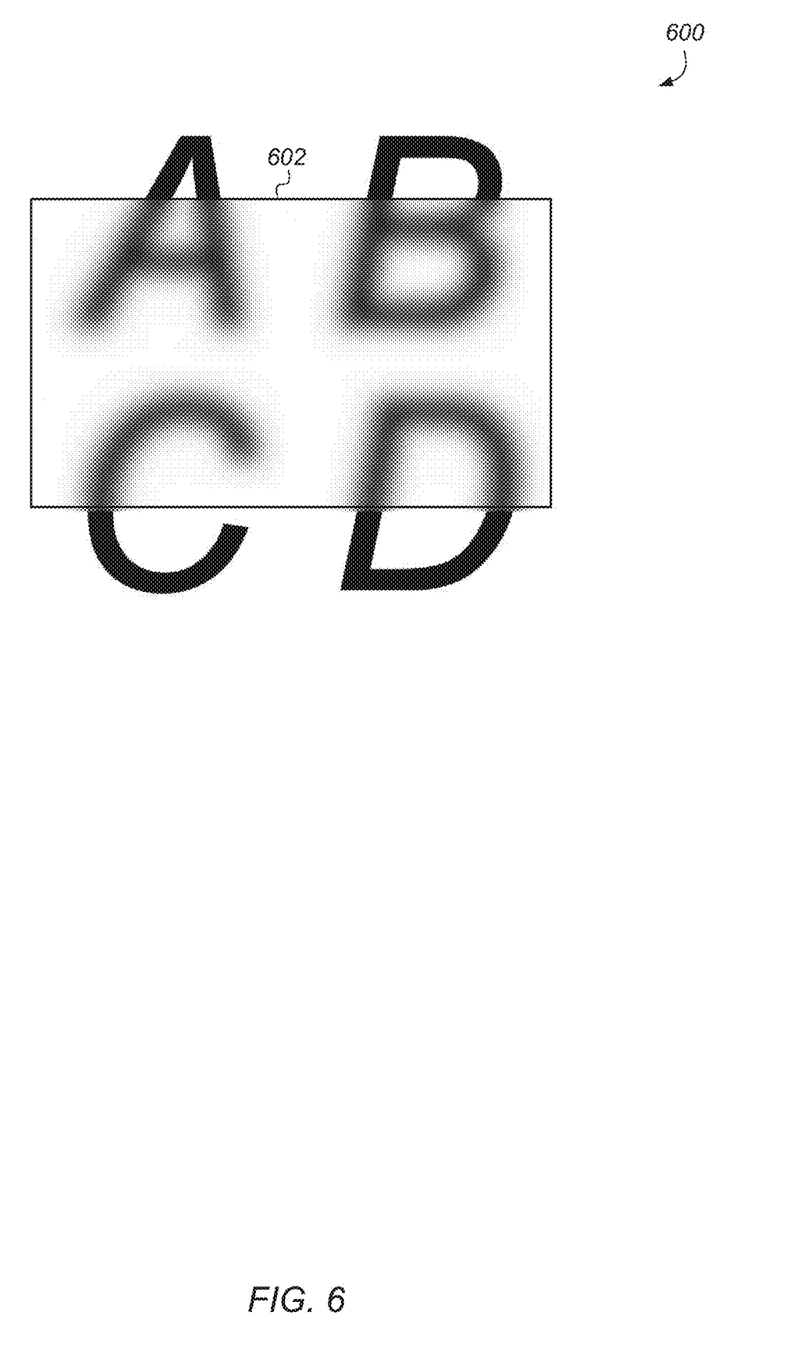
FIG. 6 is a diagram illustrating a source image with a portion of the source image blurred.

Turning now to FIG. 6, a diagram of one embodiment of a source image with a portion of the source image blurred is shown. Source image 600 shows four letters, A-D, displayed with the letters A and B displayed in a first row above the letters C and D in a second row. The blurred portion 602 of source image 600 may be blurred using the techniques described herein.

In one embodiment, in order to create the blurred portion 602, the original pixels of the corresponding region of source image 600 may be averaged together in a horizontal direction. In one embodiment, even-numbered groups of pixels from the same rows of source image 600 may be averaged together. Next, the averaged pixels may be written into the pixel buffer(s). Then, the averaged pixels may be scaled in the vertical direction followed by scaling in the horizontal direction. Alternatively, the averaged pixels may be scaled in the horizontal direction followed by scaling in the vertical direction.

Next, the downscaled pixels may be upscaled back to the original size of the selected region of source image 600. In some embodiments, this processed image may be combined with the original region of source image 600, including some level of reduced transparency (e.g., via Alpha compositing), to create blurred portion 602. In other embodiments, other steps may be utilized in addition to those described above. Additionally, one or more of the above-described steps may be performed in a different manner, one or more steps may be replaced with other suitable steps, and/or one or more steps may be omitted in other embodiments.

Figure 7:
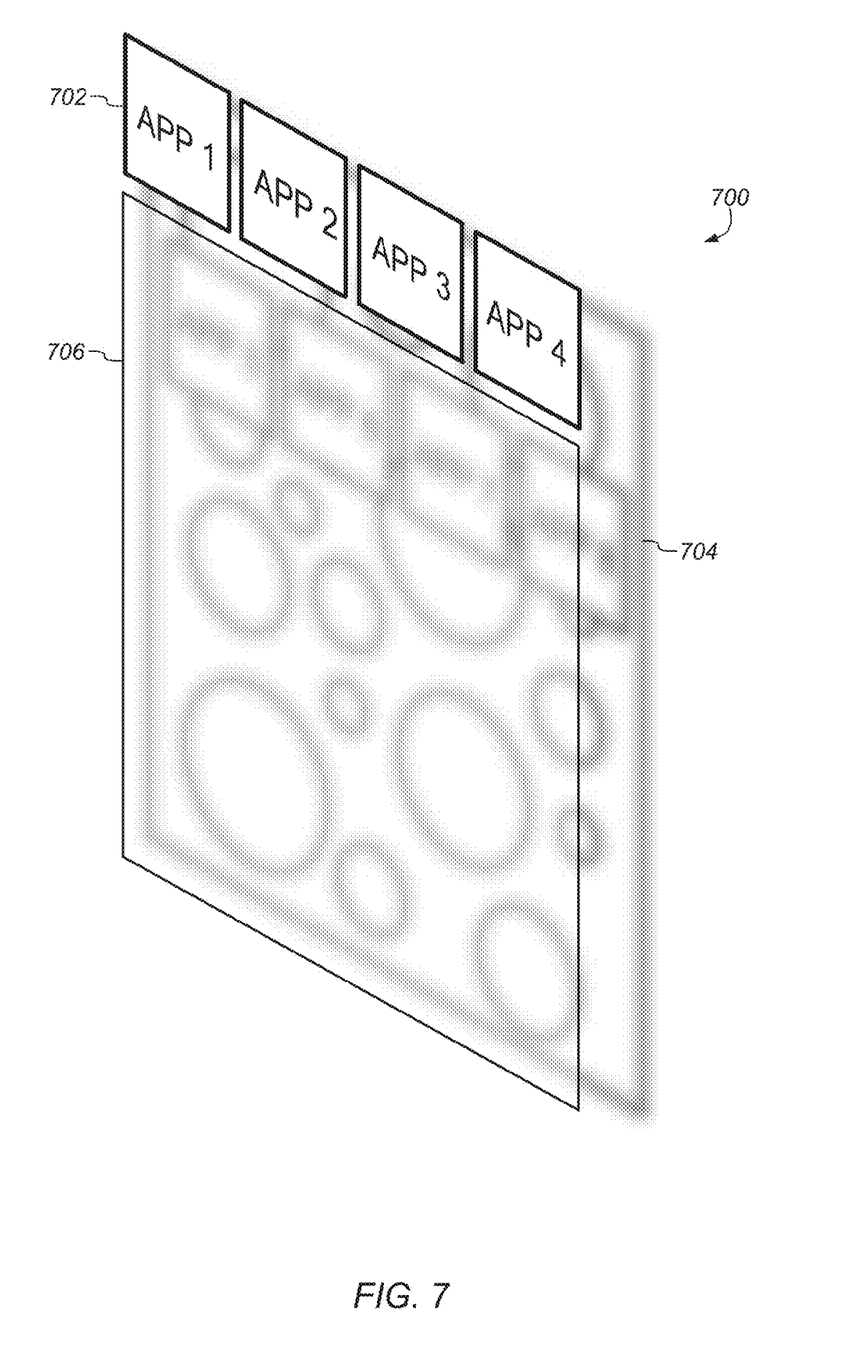
FIG. 7 is a diagram illustrating one embodiment of an output frame combining multiple layers of blurring and transparency.

Referring now to FIG. 7, a diagram of one embodiment of an output frame 700 combining multiple layers of blurring and transparency is shown. The layers are shown from a side angle to better illustrate the combination of layers which are utilized to create the blurring and transparency effects. Output frame 700 may be driven to a display (e.g., display 120) by a SoC (e.g., SoC 110). The SoC may include at least a GPU, scaler rotator unit, and display pipe.

Output frame 700 may include a bottom image layer 704 which is blurred and a top layer which is split into row 702 and semi-transparent portion 706. Row 702 may include a row of apps (App 1, App 2, App 3, App 4) which are shown in a non-blurred state. Row 702 may be the portion of the display which the user is currently viewing, and the remainder of the display may be depicted with a semi-transparent facade on top of a blurred background. Semi-transparent portion 706 may overlay the lower part of underlying blurred image 704 to provide a frosted glass appearance over the top of the blurred image 704. In other embodiments, other combinations of layers may be utilized with one or more portions of blurred images to create other desired effects that enhance the overall user interface experience of various electronic devices.

Figure 8:
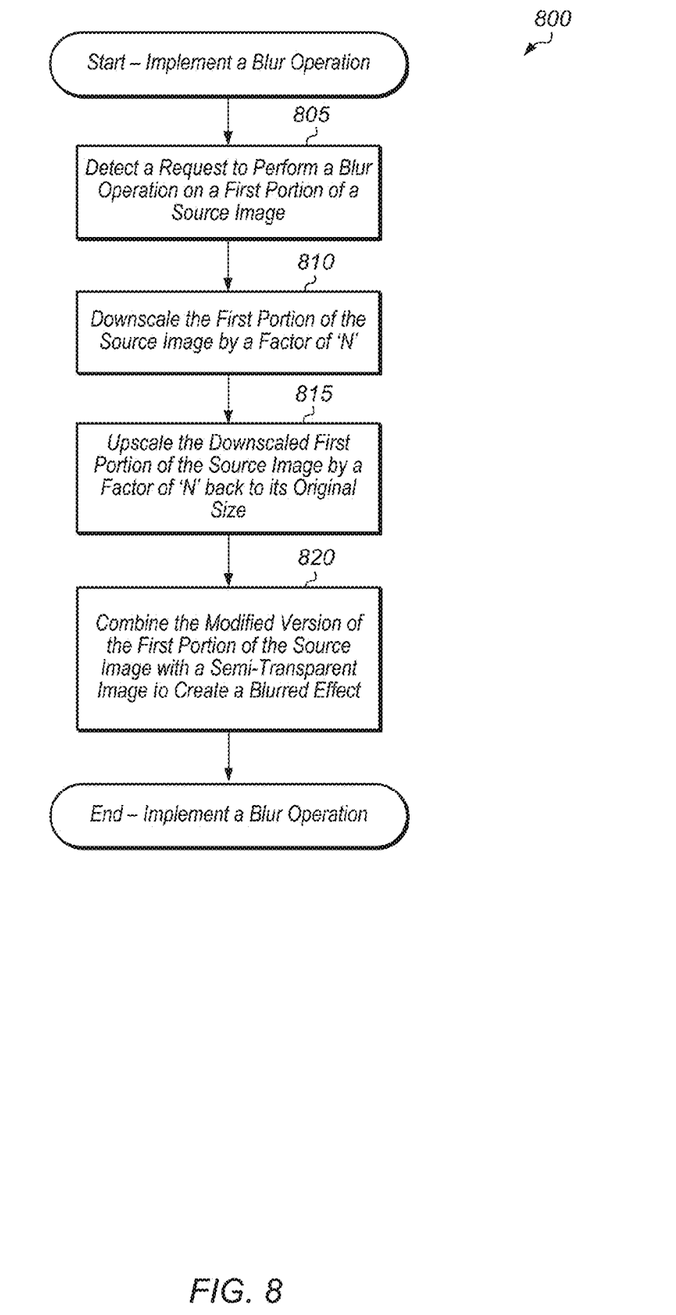
FIG. 8 is a generalized flow diagram illustrating one embodiment of a method for implementing a blur operation.

Referring now to FIG. 8, one embodiment of a method 800 for implementing a blur operation is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices including functional units (e.g., GPUs, scaler rotator units) described herein may be configured to implement method 800.

A request to perform a blur operation for a first portion of a source image may be detected (block 805). Responsive to detecting the request to perform the blur operation, the first portion of the source image may be downscaled by a factor of 'N', wherein 'N' is an integer greater than one (block 810). In one embodiment, the downscaling of the first portion of the source image by a factor of 'N' may be performed in a dedicated hardware unit (e.g., scaler rotator unit). The dedicated hardware unit may include pipelined logic for performing the downscaling in a power-efficient manner. Next, the downscaled first portion of the source image may be upscaled by a factor of 'N' back to its original size (block 815). In one embodiment, the upscaling of the downscaled first portion of the source image by a factor of 'N' may be performed in software by a processor (e.g., GPU). Then, this modified (i.e., downscaled then upscaled) version of the first portion of the source image may be combined with a semi-transparent image to create a blurred effect (block 820). After block 820, method 800 may end.

Figure 9:
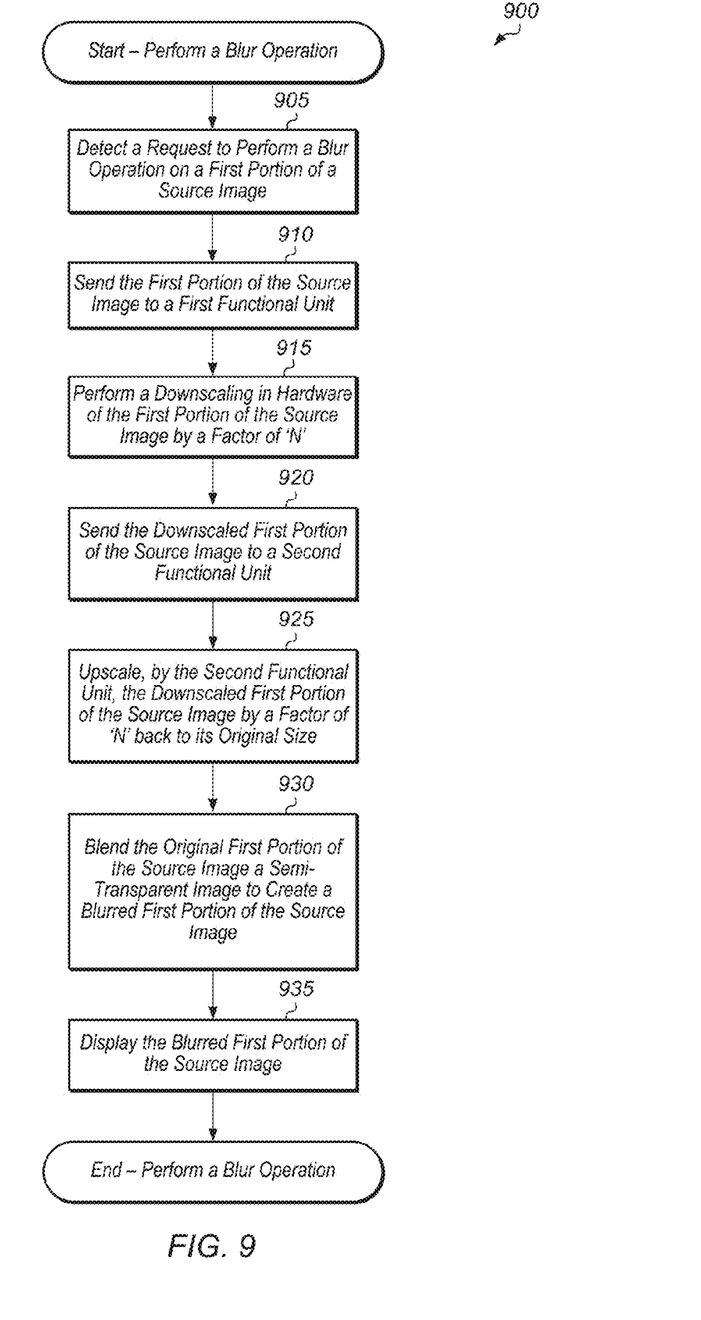
FIG. 9 is a generalized flow diagram illustrating one embodiment of a method for performing a blur operation on a first portion of a source image.

Turning now to FIG. 9, one embodiment of a method 900 for performing a blur operation on a first portion of a source image is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices including functional units (e.g., GPUs, scaler rotator units) described herein may be configured to implement method 900.

A request to perform a blur operation on a first portion of a source image may be detected, (block 905). In various embodiments, the blur operation may be performed on a host device, wherein the host device may be a smartphone, desktop computer, tablet, or other electronic device, depending on the embodiment. In response to detecting the request, pixels of the first portion of the source image may be sent to a first functional unit of the host device (block 910). In one embodiment, the first functional unit may be a scaler rotator unit. In other embodiments, the first functional unit may be any of various other types of units.

The first functional unit may perform a downscaling in hardware on the first portion of the source image by a factor of 'N', wherein 'N' is an integer greater than one (block 915). By performing the downscaling in hardware (i.e., using dedicated logic) rather than in software, substantial power savings may be obtained. In one embodiment, the first functional unit may perform a pixel averaging of pixels as they are received and then write the averaged pixels into the pixel buffers. In some embodiments, the first functional unit may write the averaged pixels into the pixel buffers in such a way that the averaged pixels are rotated by 90 degrees. Then, when the averaged pixels are read out of the pixel buffers, they will have been rotated and downscaling can be performed on the rotated first portion of the source image. The first functional unit may perform the downscaling utilizing one or more passes through the first functional unit, depending on the desired downscaling factor.

Next, the first functional unit may send the downscaled first portion of the source image to a second functional unit (block 920). In one embodiment, the second functional unit may be a GPU. In other embodiments, the second functional unit may be any of various other types of units. The second functional unit may then upscale (by a factor of 'N') the downscaled first portion of the source image back to its original size (block 925). The second functional unit may then composite a semi-transparent image with the processed version of the first portion of the source image to create a blurred first portion of the source image (block 930). The host device may then display the blurred first portion of the source image (block 935). In some embodiments, the host device may perform additional processing on the blurred first portion of the source image prior to displaying the blurred first portion of the source image. It is noted that one or more other portions of the source image may be displayed in a regular, non-blurred format. After block 935, method 900 may end.

Figure 10:
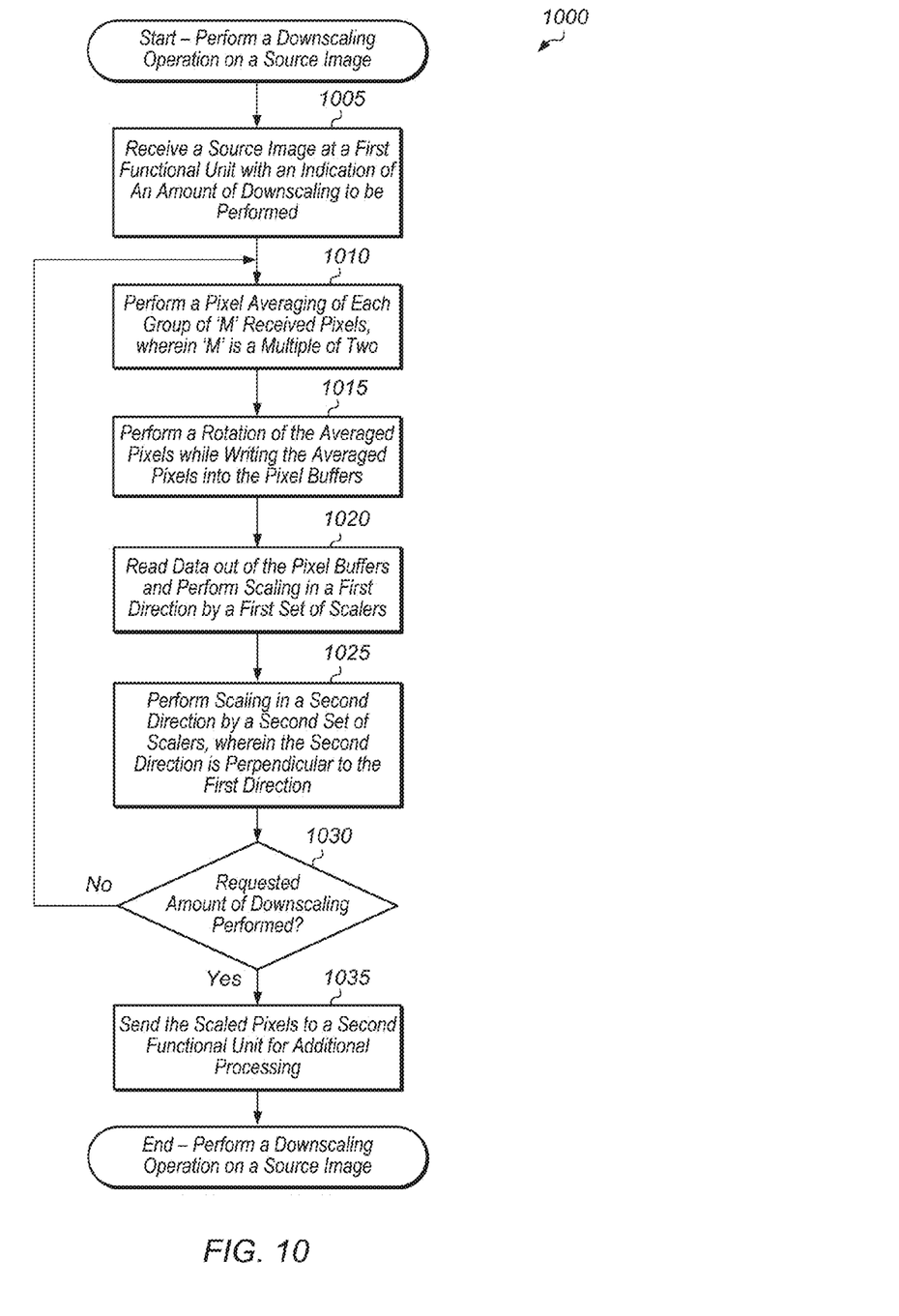
FIG. 10 is a generalized flow diagram illustrating one embodiment of a method for performing a downscaling operation on a source image.

Turning now to FIG. 10, one embodiment of a method 1000 for performing a downscaling operation on a source image is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices including functional units (e.g., GPUs, scaler rotator units) described herein may be configured to implement method 1000.

A first functional unit may receive a source image with an indication of an amount of downscaling which is to be performed on the source image (block 1005). The first functional unit may be a dedicated hardware unit with pipelined logic for scaling a source image in a power-efficient manner. In one embodiment, the first functional unit may be a scaler rotator unit of a SoC.

Next, the first functional unit may perform a pixel averaging of each group of 'M' received pixels, wherein 'M' is a multiple of two (block 1010). Additionally, the first functional unit may perform a rotation of the averaged pixels while writing the averaged pixels into the pixel buffers (block 1015). Then, a first set of scalers may read data out of the pixel buffers and perform scaling in a first direction (block 1020). The amount of scaling performed in the first direction may be programmable and may be determined based on the indicated amount of downscaling that is to be performed on the source image. Next, a second set of scalers may scale the pixels in a second direction, wherein the second direction is perpendicular to the first direction (block 1025).

Then, the first functional unit may determine if the requested amount of scaling has already been performed on the one or more passes already made through the first functional unit (conditional block 1030). If the requested amount of scaling has already been performed (conditional block 1030, "yes" leg), then the scaled pixels may be sent to a second functional unit for additional processing (block 1035). In one embodiment, the scaled pixels may be sent to a GPU to be upscaled and then combined with a semi-transparent image. In other embodiments, other types of processing may be performed by other types of functional units. After block 1035, method 1000 may end. If the requested amount of scaling has not already been performed (conditional block 1030, "no" leg), method 1000 may return to block 1010 with the scaled pixels being routed back for another pass through the first functional unit.

Figure 11:
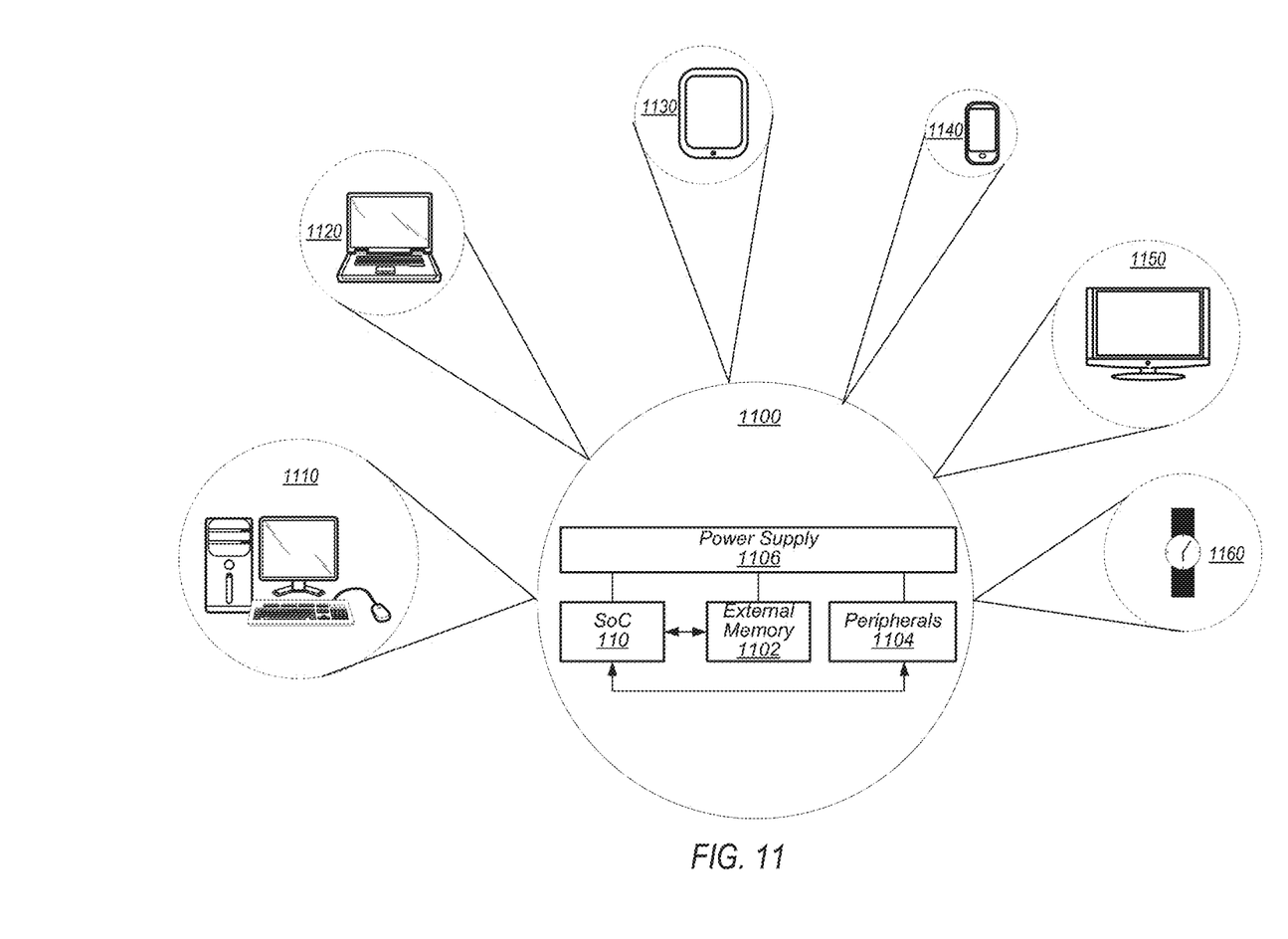
FIG. 11 is a block diagram of one embodiment of a system.

Referring next to FIG. 11, a block diagram of one embodiment of a system 1100 is shown. As shown, system 1100 may represent chip, circuitry, components, etc., of a desktop computer 1110, laptop computer 1120, tablet computer 1130, cell phone 1140, television 1150 (or set top box configured to be coupled to a television), wrist watch or other wearable item 1160, or otherwise. Other devices are possible and are contemplated. In the illustrated embodiment, the system 1100 includes at least one instance of SoC 110 (of FIG. 1) coupled to an external memory 1102.

SoC 110 is coupled to one or more peripherals 1104 and the external memory 1102. A power supply 1106 is also provided which supplies the supply voltages to SoC 110 as well as one or more supply voltages to the memory 1102 and/or the peripherals 1104. In various embodiments, power supply 1106 may represent a battery (e.g., a rechargeable battery in a smart phone, laptop or tablet computer). In some embodiments, more than one instance of SoC 110 may be included (and more than one external memory 1102 may be included as well).

The memory 1102 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 1104 may include any desired circuitry, depending on the type of system 1100. For example, in one embodiment, peripherals 1104 may include devices for various types of wireless communication, such as wifi, Bluetooth, cellular, global positioning system, etc. The peripherals 1104 may also include additional storage, including RAM storage, solid state storage, or disk storage. The peripherals 1104 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   circuitry configured to receive source image data with an original size corresponding to a source frame;
   a pixel averaging circuit configured to downscale the source image data in a first direction by averaging the source image data to generate averaged source image data, responsive to receiving a request that a blur operation be performed on the source frame and an indication of a requested amount of downscaling to be performed on the source image data;
   a first scaler configured to downscale the averaged source image data in a second direction to generate first scaled source image data;
   a second scaler configured to downscale the first scaled source image data in the first direction to generate downscaled source image data; and control logic configured to:
send the downscaled source image data to the pixel averaging circuit responsive to determining the requested amount of downscaling has not been performed; and
send the downscaled source image data to memory responsive to determining the requested amount of downscaling has already been performed.

2. The apparatus as recited in claim 1, wherein the control logic is further configured to adjust an amount of downscaling for the first scaler and the second scaler based on a remaining amount of downscaling to be performed on the source image data.

3. The apparatus as recited in claim 1, wherein the pixel averaging circuit is configured to average the source image data by adding pixels of the source image data to produce a sum and rounding one or more least significant bits of the sum.

4. The apparatus as recited in claim 1, wherein the control logic is further configured to:
store the averaged source image data in one or more pixel buffers; and
downscale the averaged source image data in the first direction after reading the averaged source image data out of the one or more pixel buffers and prior to upscaling the averaged source image data back to the original size.

5. The apparatus as recited in claim 1, wherein the second direction is perpendicular to the first direction.

6. The apparatus as recited in claim 1, wherein each of the first scaler and the second scaler is configured to utilize a multi-tap polyphase filter to downscale source image data.

7. The apparatus as recited in claim 1, wherein the control logic is further configured to perform a rotation of the source image data when writing the source image data into one or more pixel buffers.

8. A computing system comprising:
a memory configured to store source frame;
a display; and
a plurality of functional units comprising a scaler unit configured to:
receive source image data corresponding to a source frame from the memory;
responsive to receiving a request that a blur operation be performed on the source frame and an indication of a requested amount of downscaling to be performed on the source image data:
downscale the source image data in a first direction by averaging the source image data to generate averaged source image data;
downscale the averaged source image data in a second direction to generate first scaled source image data;
downscale the first scaled source image data in the first direction to generate downscaled source image data;
send the downscaled source image data to the pixel averaging circuit responsive to determining the requested amount of downscaling has not been performed; and
send the downscaled source image data to memory responsive to determining the requested amount of downscaling has already been performed.

9. The computing system as recited in claim 8, wherein the plurality of functional units further comprises a graphics processing unit configured to:
upscale the downscaled source image data back to the original size; and
combine the upscaled source image data with semi-transparent image data to produce a blurred version of the source frame.

10. The computing system as recited in claim 8, wherein the scaler unit is configured to average the source image data by adding pixels of the source image data to produce a sum and rounding one or more least significant bits of the sum.

11. The computing system as recited in claim 8, wherein the scaler unit is further configured to:
store the averaged source image data in one or more pixel buffers; and
downscale the averaged source image data in the first direction after reading the averaged source image data out of the one or more pixel buffers and prior to upscaling the averaged source image data back to the original size.

12. The computing system as recited in claim 8, wherein the second direction is perpendicular to the first direction.

13. The computing system as recited in claim 8, wherein the scaler unit is configured to utilize a multi-tap polyphase filter to downscale the source image data in the second direction.

14. The computing system as recited in claim 8, wherein the the scaler unit is further configured to adjust an amount of downscaling for the first scaler and the second scaler based on a remaining amount of downscaling to be performed on the source image data.

15. A method comprising:
receiving source image data corresponding to a source frame;
responsive to receiving a request that a blur operation be performed on the source frame and an indication of a requested amount of downscaling to be performed on the source image data:
downscaling the source image data in a first direction by averaging the source image data, which generates averaged source image data;
downscaling the averaged source image data in a second direction to generate first scaled source image data;
downscaling the first scaled source image data in the first direction to generate downscaled source image data;
sending the downscaled source image data to the pixel averaging circuit responsive to determining the requested amount of downscaling has not already been performed; and
sending the downscaled source image data to memory responsive to determining the requested amount of downscaling has already been performed.

16. The method as recited in claim 15, further comprising:
upscaling the downscaled source image data back to the original size; and
combining the upscaled source image data with semi-transparent image data to produce a blurred version of the source frame.

17. The method as recited in claim 15, wherein averaging the source image data comprises adding pixels of the source image data to produce a sum and rounding one or more least significant bits of the sum.

18. The method as recited in claim 15, further comprising:
storing the averaged source image data in one or more pixel buffers; and
downscaling the averaged source image data after reading the averaged source image data out of the one or more pixel buffers and prior to upscaling the averaged source image data back to the original size.

19. The method as recited in claim 15, wherein the second direction is perpendicular to the first direction.

20. The method as recited in claim 15, further comprising adjusting an amount of downscaling for the first scaler and the second scaler based on a remaining amount of downscaling to be performed on the source image data.

* * * * *